United States Patent
Schubert (10) Patent No.: US 6,690,451 B1
(45) Date of Patent: Feb. 10, 2004

(54) LOCATING OBJECT USING STEREO VISION

(76) Inventor: Gerald S. Schubert, 7 Capobella, Irvine, CA (US) 92614

( * ) Notice: Subject to any disclaimer, the term of this patent is extended or adjusted under 35 U.S.C. 154(b) by 0 days.

(21) Appl. No.: 10/359,943

(22) Filed: Feb. 6, 2003

(51) Int. Cl.[7] .................... G01C 3/00; G01C 17/00; G06K 9/00
(52) U.S. Cl. ............. 356/3.14; 382/103; 382/106; 382/154; 702/150; 702/152
(58) Field of Search .................... 356/3.14, 3.15, 356/3.16, 139.03; 382/103, 106, 154; 702/150, 152

(56) References Cited

U.S. PATENT DOCUMENTS 6,501,537 B1 * 12/2002 Chahl et al. ............... 356/3.14

* cited by examiner

Primary Examiner—Stephen C. Buczinski
(74) Attorney, Agent, or Firm—Blakely, Sokoloff, Taylor & Zafman (57) ABSTRACT

One embodiment of the invention determines position of an object with respect to an original location. A first relative position of the first object with respect to a second object in a first scene is computed using a current first image of the first object and a second image of the second object provided by at least first and second image sensors. The current first image in the first scene is matched with a next first image of the first object in a second scene. The second scene contains a third object having a third image. A second relative position of the third object with respect to the second object in the second scene is computed using the third image and the next first image.

20 Claims, 11 Drawing Sheets

LOCATING OBJECT USING STEREO VISION

BACKGROUND

1. Field of the Invention

Embodiments of the invention relates to the field of object location, and more specifically, to object location using vision.

2. Description of Related Art

Locating an object position has a number of practical applications. For example, a person parks his car in a parking structure at the office building and walks to the office. When he leaves the office, he may forget where he parked his car and may spend a considerable amount of time to look for it. In another scenario, a person may get lost and may not be able to return back to the original location.

Techniques to locate objects have a number of disadvantages. One technique is to use a Global Positioning System (GPS). However, the GPS technique is expensive, may not work where signal reception is poor, and requires two communication devices to locate the object. Another technique is to use radio transmitter to transmit a search signal with predefined frequency to the object. This technique can only work when the object is located near the transmitter and may not work when signal reception is poor such as in a multi-floor parking structure.

BRIEF DESCRIPTION OF THE DRAWINGS

The invention may best be understood by referring to the following description and accompanying drawings that are used to illustrate embodiments of the invention. In the drawings.

DESCRIPTION

One embodiment of the invention determines position of an object with respect to an original location. A first relative position of the first object with respect to a second object in a first scene is computed using a current first image of the first object and a second image of the second object provided by at least first and second image sensors. The current first image in the first scene is matched with a next first image of the first object in a second scene. The second scene contains a third object having a third image. A second relative position of the third object with respect to the second object in the second scene is computed using the third image and the next first image.

In the following description, numerous specific details are set forth. However, it is understood that embodiments of the invention may be practiced without these specific details. In other instances, well-known circuits, structures, and techniques have not been shown in order not to obscure the understanding of this description.

Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (such as flash memory, read only memory (ROM), and erasable ROM (EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 1:
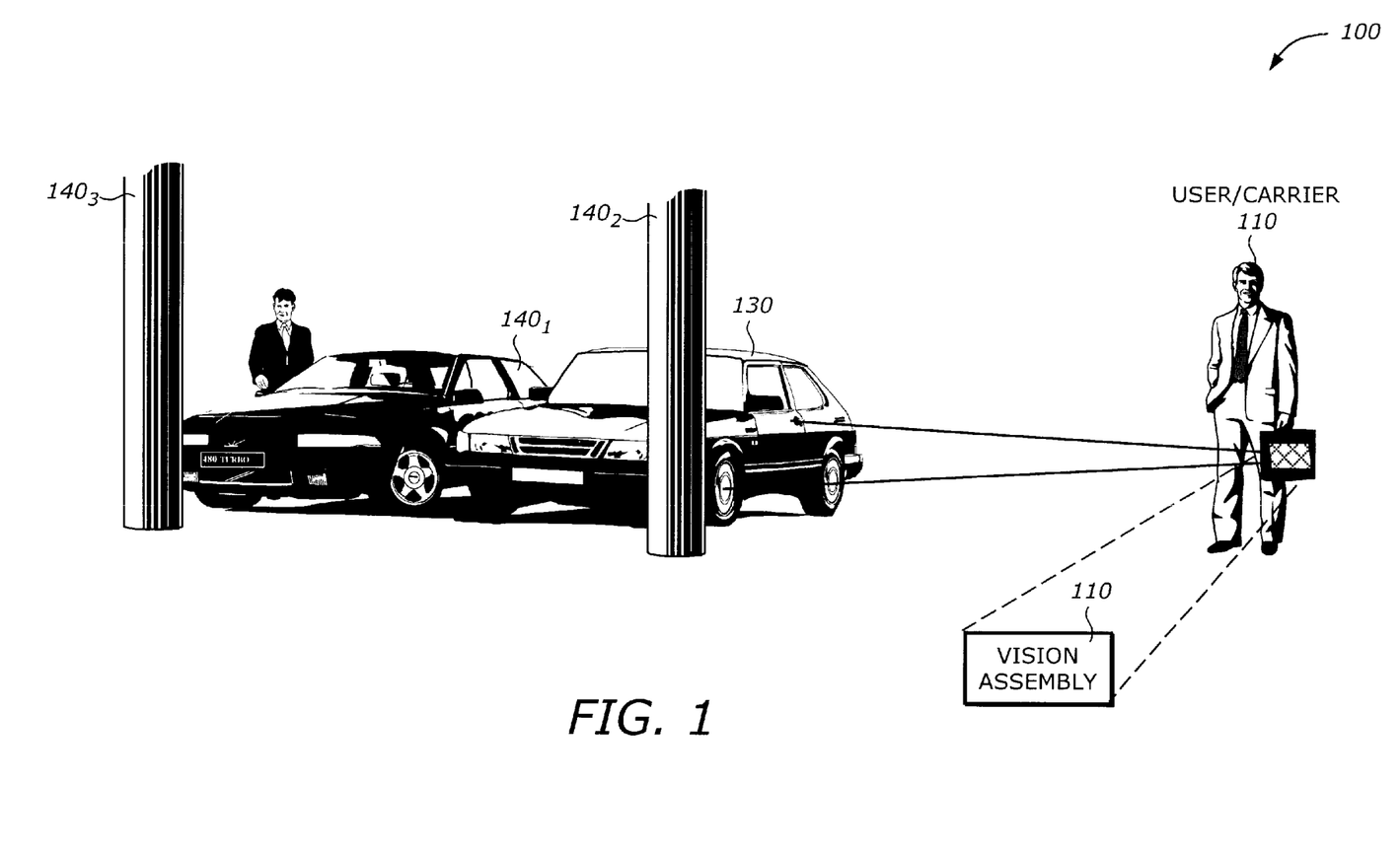
FIG. 1 is a diagram illustrating a system in which one embodiment of the invention can be practiced.

FIG. 1 is a diagram illustrating a system 100 in which one embodiment of the invention can be practiced. The system 100 includes a vision assembly 110, a user or carrier 120, an original object 130, and scene objects $140_I$ to $140_N$.

The vision assembly 110 is in essence an electronic eye assembly that includes image sensors and processing subsystem to process images. The vision assembly 110 can be made as an integrated unit that can be carried by or mounted on the user/carrier 120. Its components can also be mounted, installed, or attached at various places at the user/carrier 120.

The user/carrier 120 may be a person who carries the vision assembly 110 to perform object location. The user/carrier 120 may carry the vision assembly 110 at any place on his/her body as appropriate. The user/carrier 120 may also be a vehicle or any other moving platform. In one embodiment, the user/carrier 120 uses the vision assembly 110 to determine his/her/its position with respect to an original, starting or known position as he/she moves away from the original or starting position.

The original object 130 is an object at the original, starting, or known position from which the user/carrier 120 wants to determined his/her/its position. The original object 130 may be a landmark structure, a marker, a vehicle, a fixed structure, or any object that is used to mark the original or starting position.

The scene objects $140_I$ to $140_N$ are any objects in the scene as captured by the vision assembly 110. In one embodiment, the scene objects are static or fixed objects located at the scene. In another embodiment, some of the scene objects may be dynamic or moving, as long as there are other static or fixed objects in the scene. Examples of the scene objects may include vehicles, door knobs, pictures hanging on the wall, traffic lights on streets, street signs, billboards, graffities, trees, buildings, poles, posts, etc.

There are a number of possible applications or scenarios using the vision assembly 110. The main use is to determine the location of the user/carrier 120 with respect to the original position (e.g., the object 130) as the user/carrier 120 moves away from the original position. Another use of the vision assembly 110 is to allow the user/carrier 120 to return back to the original position. As an example, the user/carrier 120 parks his car at a parking spot in a parking garage or structure. The parked car is the original object 130. The user/carrier 120 carries the vision assembly 110 with him when he walks away from his car 130 to the office. The vision assembly 110 may be mounted on his body, clothes, shoes, suitcase, belts, etc. As he walks away from his car, the vision assembly 110 keeps track of his position. As he reaches his destination (e.g., an office, a building next to the parking structure, a theme park, a restaurant, or any place), the vision assembly 110 continuously calculates his position and accumulates the history of his positions during the movement from the original position to the destination. When the user/carrier 120 returns from the destination back to the original position, the vision assembly 110 will provide guidance or direction to help him to walk back to his parked car or to locate his car. The user/carrier 120, therefore, does not need to record or memorize where he parked his car. The scenario is applicable to a number of situations such as parking at a parking lot of a theme park, at the airport, at a multi-level parking structure, etc. Any other applications where it is desired to remember how to return to an original position can utilize the vision assembly 110 in the present invention. Examples include tracking lost children, hikers, stolen objects or vehicles, etc.

Figure 2:
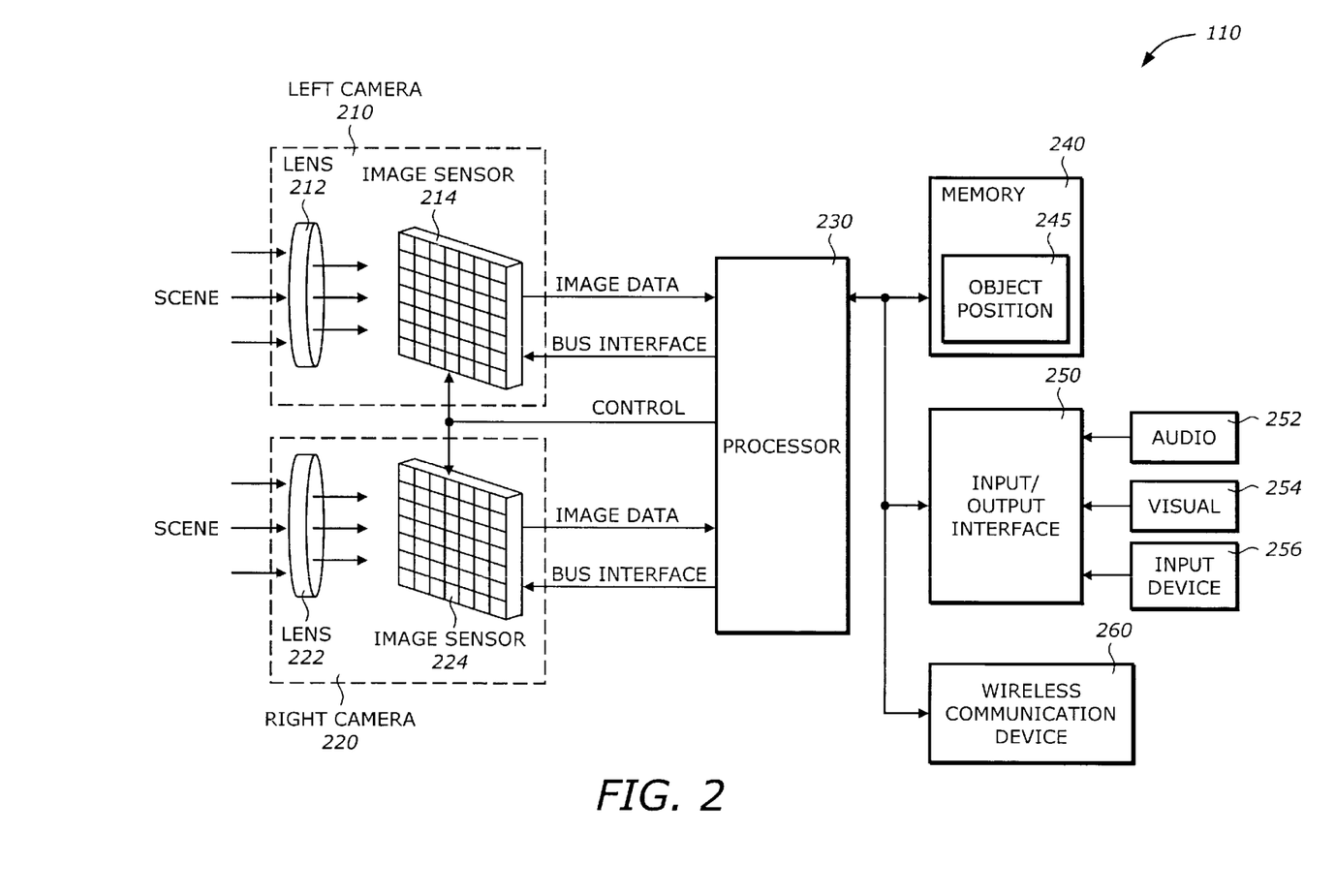
FIG. 2 is a diagram illustrating a vision assembly according to one embodiment of the invention.

FIG. 2 is a diagram illustrating the vision assembly 110 according to one embodiment of the invention. The vision assembly 110 includes at least two cameras 210 and 220, a processor 230, a memory 240, an input/output (I/O) interface 250, and a wireless communication device 260. Note that the vision assembly 110 may contain more or less components than the above.

The two cameras 210 and 220 or camera modules capture images of the scene containing the objects. More than two cameras can be used. The cameras 210 and 220 are connected or arranged to provide stereo images. They may be the same or different, but similar types of cameras with identical structures facilitate the computation and calibration. For brevity, the left camera 210 will be described. The right camera 220 is similar. The left camera 210 includes a lens assembly 212 and an image sensor 214. The lens assembly 210 includes any suitable lens, iris controller, and a focus adjustment mechanism. The lens has a focal length b. This focal length b is usually known in advance. The focal length b is typically related to the distance between the camera and the objects and the dimension of the view as captured by the image sensor. Typical values of the focal length are 8 mm, 16 mm, 25 mm, 35 mm, 50 mm, and 75 mm. The image sensor 214 is any two-dimensional image sensor. Examples are Complementary Metal Oxide Semiconductor (CMOS) and Charged Coupled Devices (CCD) sensors. The image sensor 214 may be black and white or color, may have any suitable array format, size, resolution, or number of pixels. Typical array format may range from 400H×400V to 2000H×2000V where H and V refer to horizontal and vertical, respectively. The image sensor 214 typically has interface or driver circuitry to the processor 230. Examples of the interface circuits may include serial bus such as I²C or Universal Serial Bus (USB), parallel data bus, analog-to-digital converter, vertical and horizontal timing, gain control, snapshot control, serial driver, parallel driver, etc.

The processor 230 is any processing element that can execute instructions in a program or perform dedicated tasks. The processor 230 may include a number of hardware circuits designed specifically for dedicated functions. It may also include both dedicated hardware circuits and software modules to perform tasks as will be described later. The processor 230 interface with the cameras 210 via any types of interfaces Typically, the processor 230 receives image data through parallel or serial bus. It may also has standardized bus (e.g., I²C) to receive status or send control information. It may also have separate control bus to send control information. The control information may include gain adjustment, snapshot activation, and any other image sensing control functions.

The processor 230 may also be a general-purpose computing system with memory and I/O controllers. It may include a central processing unit (CPU), a processor bus, a memory control hub (MCH), an input/output control hub (ICH), a peripheral bus, a mass storage device, input/output devices, and a network device. The processor 230 may be a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The memory 240 is any suitable semiconductor memory to store program and data. For embedded applications such as when the vision assembly 110 is used as a standalone or integrated unit, the memory 240 may be a read only memory (ROM) including erasable ROM or flash memories and random access memory (RAM) including static RAM and/or dynamic RAM. The ROM primarily stores program code or instructions and permanent data. The RAM is used for temporary storage. The memory 240 includes an object position location module 245. The object position location module 245 contains program code that, when executed by the processor 240, causes the processor 510 to perform specified operations.

The I/O interface 250 provides interface to I/O devices such as audio device 252 (e.g., microphone, speaker, speech synthesizer), visual or video device 254 (e.g., light indicator, graphics display, display monitor), input device 256 (e.g., button, keyboard, joystick, trackball, mouse, pen). Examples of I/O functions may include displaying direction indicators (e.g., arrows pointing to left, right, forward, backward or West, East, North, South) or distance indicator, generating spoken words, entering commands such as initialization, start and/or stop operations, etc.

The wireless communication device 260 provides wireless communication between the vision assembly 110 and another wireless device. In one embodiment, the user/carrier 120 may transmit the position information (e.g., xyz coordinates) to inform others his/her/its location with respect to the original location. In another embodiment, another wireless communication device may send a command to the device 260 to inquire about the status and/or retrieve the position information. The processor 230 or the object position location module 245 may perform communication tasks using the device 260. Examples of these tasks include management of communication with other wireless communication devices, responding to command received from other devices, sending out status and/or position information on a continuous, periodical, or on-demand basis. The wireless connectivity used by the device 260 may be any suitable type including Bluetooth, radio, infrared, Wireless Fidelity (Wi-Fi), cellular phone, Institute of Electrical and Electronics Engineers (IEEE) 802.11x (e.g., 802.11a, 802.11b, 802.11g), etc.

Figure 3:
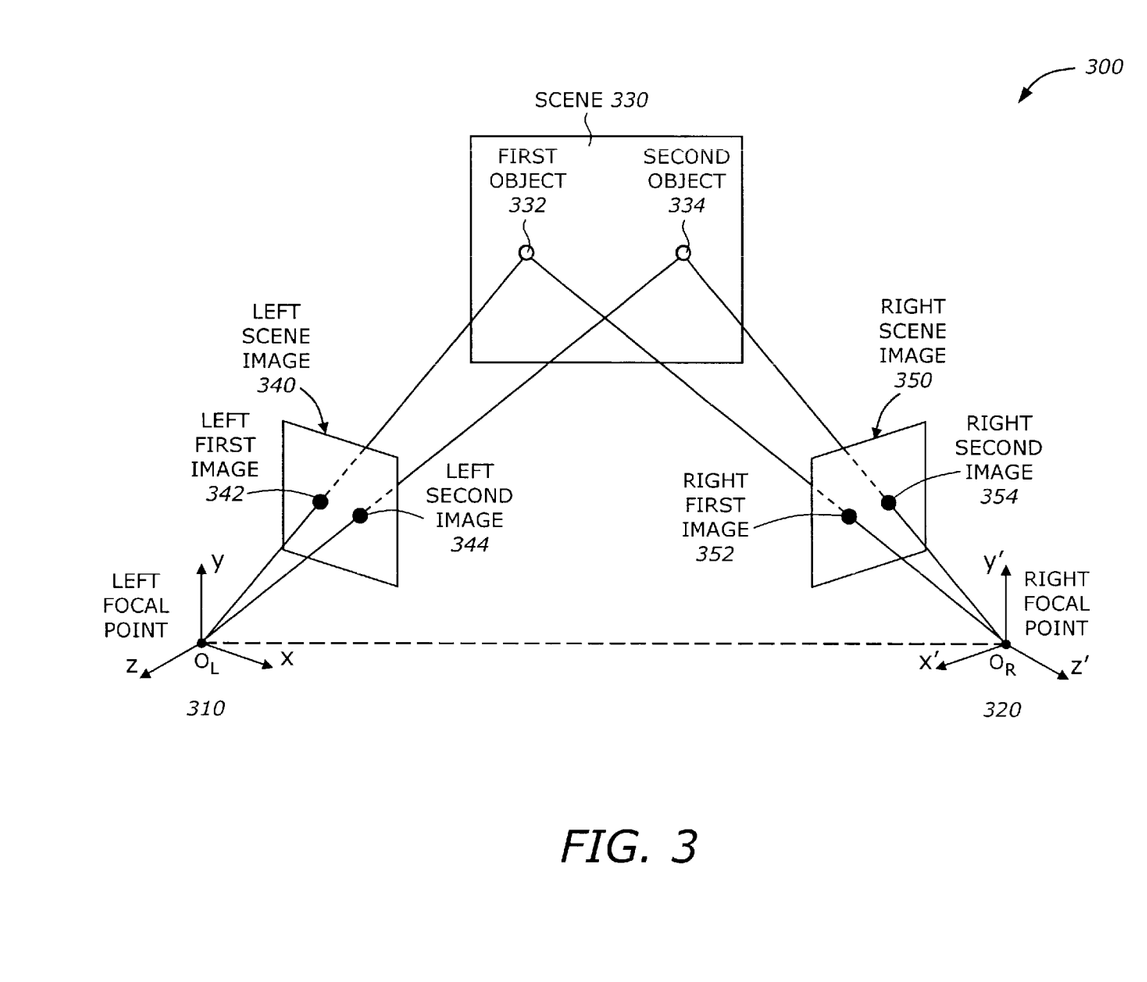
FIG. 3 is a diagram illustrating a stereo imaging geometry according to one embodiment of the invention.

FIG. 3 is a diagram illustrating a stereo imaging geometry 300 according to one embodiment of the invention. The stereo imaging geometry 300 includes left and right focal points 310 and 320, left and right scene images 340 and 350, and scene 330. Although two camera systems are shown, it is contemplated that more than two cameras or image planes can be used.

The left and right focal points $O_L$ and $O_R$ 310 and 320 are the focal points of the left and right cameras 210 and 220. These points also serve as the origins of a three-dimensional coordinate systems (x, y, z) and (x', y', z'). The computations of the object positions may be referenced to a common coordinate system such as one of (x, y, z) and (x', y', z'). The left and right scene images 340 and 350 contain images of the scene as captured by the corresponding left and right image sensors. For illustrative purposes, the left and right scene images 340 and 350 are shown to be between the respective focal points and the scene 330. The focal points 310 and 320 may be between the left and right scene images 340 and 350 and the scene 330.

The scene 330 is the three-dimensional scene in the real world. The scene 330 may contain a number of objects such as first object 332 and second object 334. Through projective geometry, the first and second objects 332 and 334 are projected onto the left scene image 340 as the left first and second object images 342 and 344. Similarly, the first and second objects 332 and 334 are projected onto the right scene image 350 as the right first and second object images 352 and 354.

Figure 4:
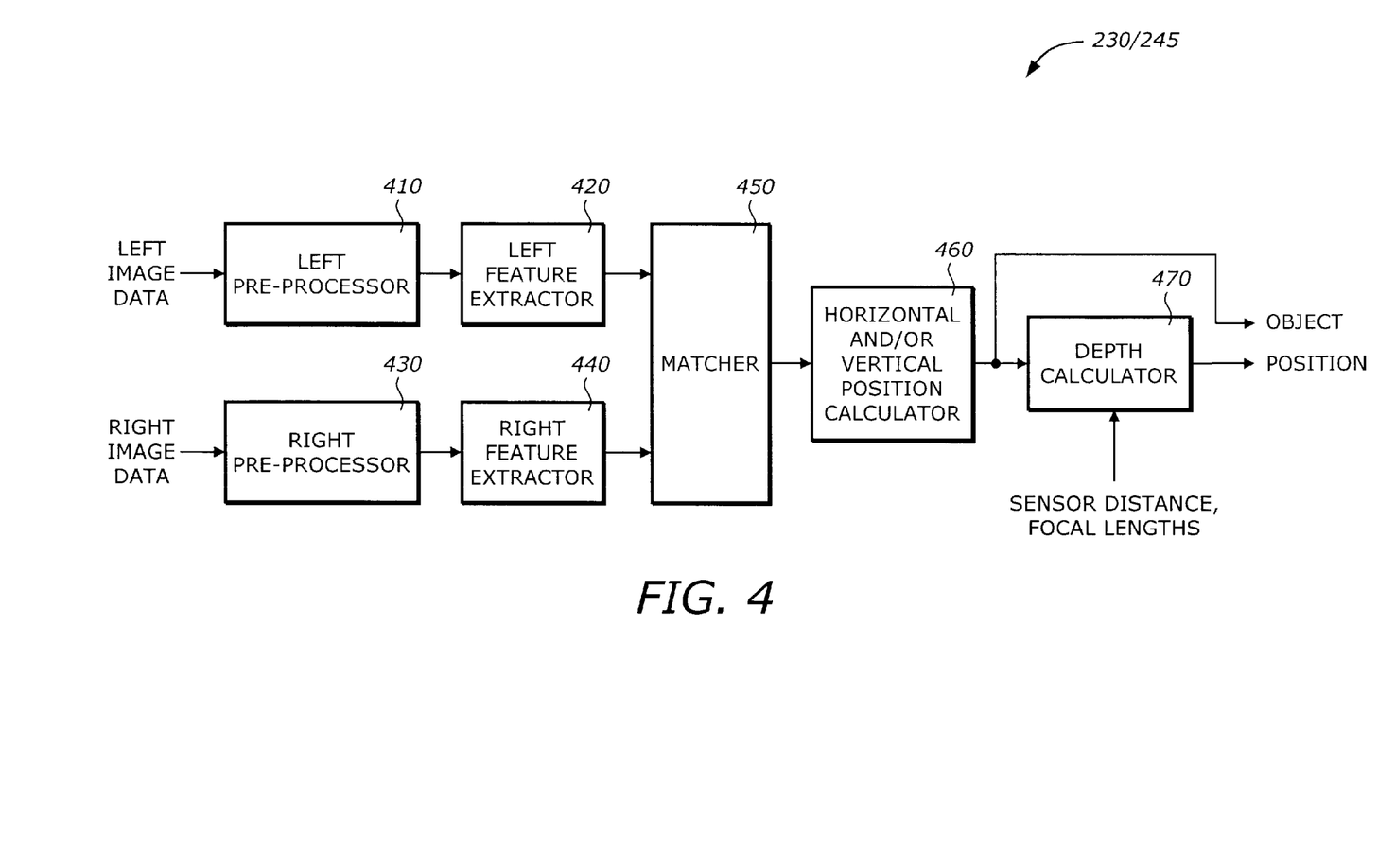
FIG. 4 is a diagram illustrating an object position location according to one embodiment of the invention.

FIG. 4 is a diagram illustrating the object position locator 230/245 according to one embodiment of the invention. The object position locator 230/245 may be implemented by hardware circuits, by software modules or functions, or any combination of both. The object position locator 230/245 includes a left pre-processor 410, a left feature extractor 420, a right pre-processor 430, a right feature extractor 440, a matcher 450, a horizontal/vertical position calculator 460, and a depth calculator 470. Note that although the left and right pre-processors and feature extractors are shown separately and operating in parallel, they may be the same and operate sequentially.

The left and right pre-processors 410 and 430 and the left and right feature extractors 420 and 440 are similar. For brevity, only the left pre-processor 410 and the left feature extractor 420 are described. The left pre-processor 410 pre-processes a scene image as captured or provided by the left image sensor 214 (FIG. 2). The pre-processing tasks may include image analysis or processing operations such as filtering, smoothing, sharpening, edge detection, color filtering, enhancement, histogram equalization, binarization, etc. The objective is to facilitate the extraction of dominant features or relevant images of the objects in the scene.

The left feature extractor 420 extracts an image of an object in the scene. The object may be any relevant object used as reference points for calculating of position. The object may be a point, a blob, a patch, a line, a region, etc on a vehicle, a structure, a sign, or any relevant object in the scene. The feature extractor 320 may extract corner points, edge points, centroids of blobs, or any other features that are useful as reference points. After the pre-processing, the feature extractors 420 and 440 may extract a number of object images. For ease of reference and clarity, these object images are referred to as object points.

The matcher 450 performs a number of matching operations. These matching operations are part of a correspondence process. The correspondence process determines which object images in one scene image corresponds to which object images in another scene image. The scene images may be spatial (e.g., stereo pair) or temporal (e.g., cinematic sequence). In general, the matching technique is similar for both spatial and temporal scene images although special techniques may be employed for each type based on a priori knowledge of camera geometry or motion characteristics.

The stereo matching matches the left image and the right image of an object. For example, the left scene image may contain N object points and the right scene image may contain M object points. The matcher 450 matches object points from one scene image to the other scene image. The result of the matching is used to compute the depth position of the object.

The temporal matching matches an object image in a scene image at time t and the object image in a next scene at time t+1. The time interval from a current scene to the next scene depends on the motion of the vision assembly 110. The result of the matching is to establish an intermediate object so that relative position of a new object can be computed with respect to the original position.

Figure 5:
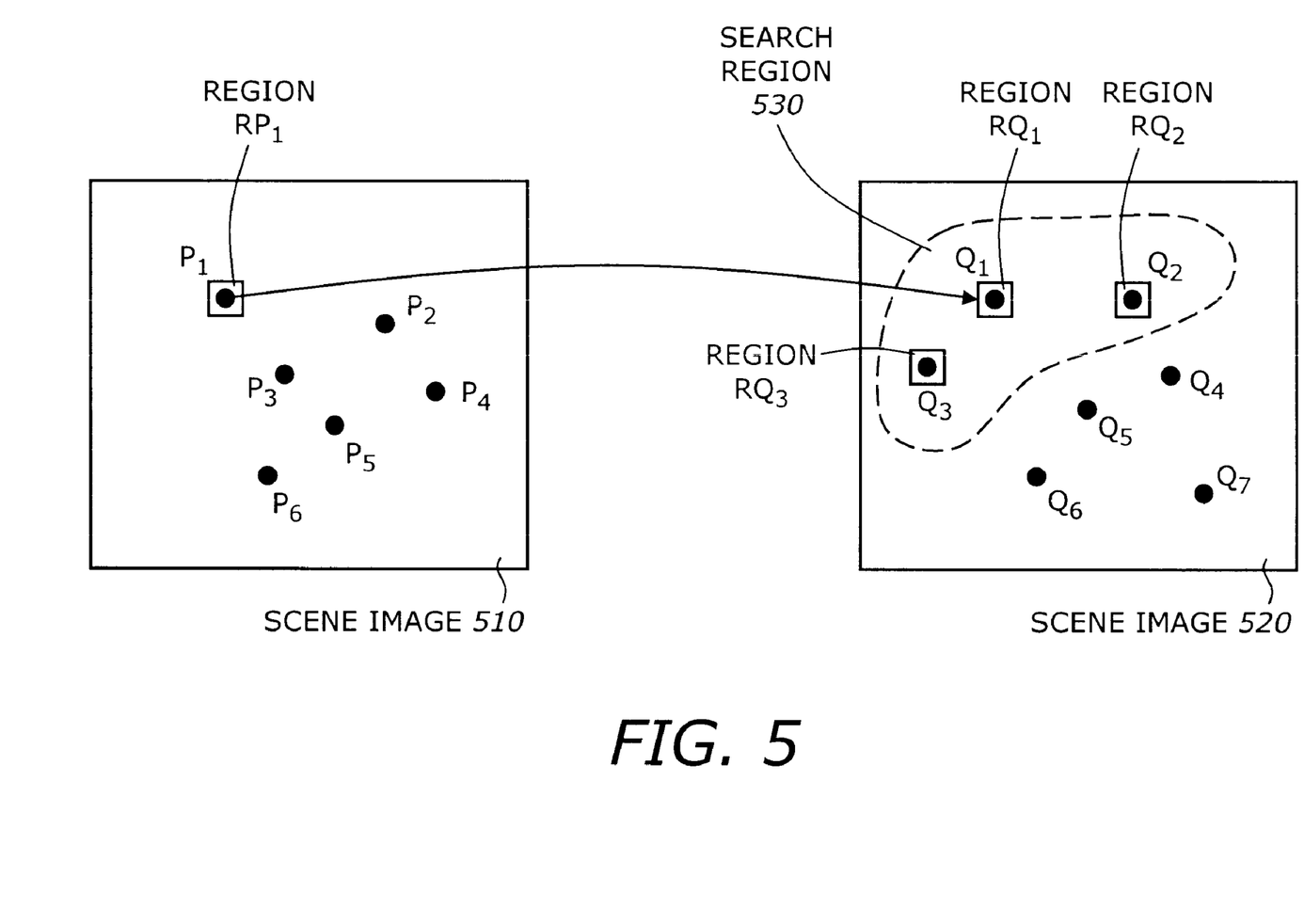
FIG. 5 is a diagram illustrating a matching according to one embodiment of the invention.

FIG. 5 is a diagram illustrating a matching according to one embodiment of the invention. The matching operation is to match object points on the first scene image 510 and the second scene image 520.

The first and second scene images 510 and 520 may represent the stereo pair of left and right scene images for stereo matching or two successive scene images taken at different times of either the left or the right images for temporal matching. Both types of matching are similar and are used in the object position locator. The matching operation is performed by the matcher 450 shown in FIG. 4. In the illustrative example shown in FIG. 5, the first scene image 510 contains the object points P1, P2, P3, P4, P5, and P6 and the second scene image 520 contains the object points Q1, Q2, Q3, Q4, Q5, Q6, and Q7.

For each matching, the matcher 450 gives a matching score or similarity measure representing how well the object points are matched together. Any unmatched object points may be discarded. Typically, the matcher 450 keeps only those object points that have the strongest matching scores. Any matching technique can be used. In one embodiment, the matching technique is the correlation technique. In this technique, for each object point $P_k$ in one image scene, a number of candidate object points $P_j$'s in the other image scene are determined. These candidate object points may be obtained based on camera geometry. One way is to obtain candidate object points as those points within a search region or a neighborhood of $P_k$. The region of the neighborhood is related to the distance between the image sensors and/or their relative orientation. For each candidate object point, a region surrounding the object point is determined. The size of the region depends on the match accuracy requirement and/or the image size. Typically, the object point is the center of the surrounding region. The surrounding region may be a square region of size 7×7, 9×9, or 21×21, etc. Then, a similarity measure is computed between the region surrounding $P_k$ and the candidate region. The candidate object point that has the best or highest similarity measure is declared to be the matched object point for $P_k$. The similarity measure may be computed using a number of methods. For example, it may be computed as the relative difference between the pixel values of the two regions. It may also be a combination of several descriptors of the object points such as color attributes, edge or corner point strength, local busyness, etc. Additional constraints may be imposed to eliminate false matches. Some constraints include rigidity constraint and motion constraint. An example of the rigidity constraint states that two distances between the same two object points in two successive scenes is the same. An example of a motion constraint is that an object undergoes a smooth trajectory, such as a substantially straight line or a smooth curve.

For example, suppose it is desired to match the object point P1 in the scene image 510 to an object point in the scene image 520. A search region 530 is created which cover the neighborhood of the object point P1. The size of the search region 530 is selected based on the knowledge of the camera geometry, such as the relative position and orientation between the image sensors. Within this search region 530, there are three candidate object points: Q1, Q2, and Q3. The object point P1 has a surrounding region R1. Similarly, the object points Q1, Q2, and Q3 have surrounding regions RQ1, RQ2, and RQ3, respectively. To find a match, the region RP1 is compared with the regions RQ1, RQ2, and RQ3. Which region has the highest similarity measure is determined to be the matched object point.

Figure 6:
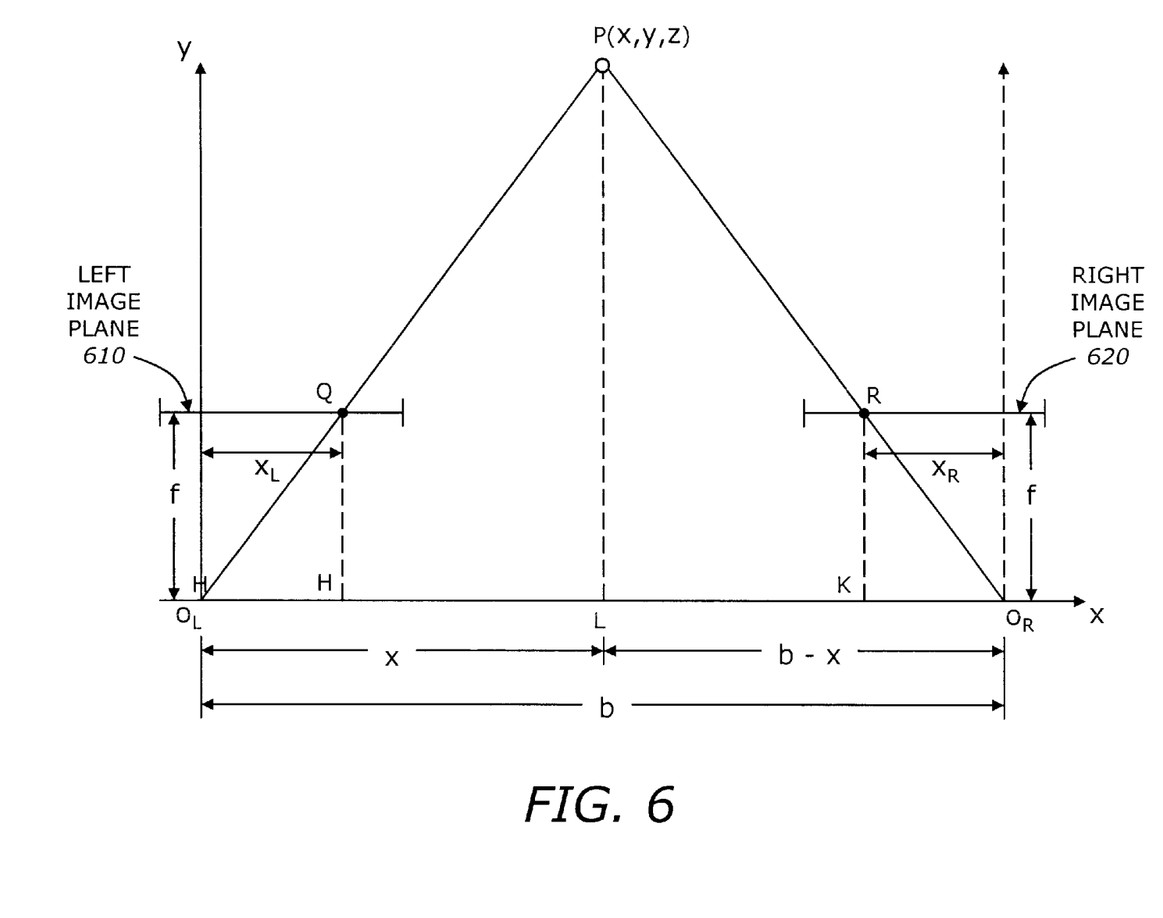
FIG. 6 is a diagram illustrating calculating depth positions according to one embodiment of the invention.

FIG. 6 is a diagram illustrating calculating depth positions according to one embodiment of the invention.

The camera geometry includes the focal points $O_L$ and $O_R$ for the left and right image sensors. The focal point $O_L$ is assumed to be the original of the coordinate system. The object point P in the scene has coordinates (x, y, z). For clarity, the geometry is shown for the x-coordinate component or the horizontal position. The derivations are similar for the y-coordinate component or the vertical position. For simplicity, it is assumed that the image sensors are located to align horizontally so that the object image on the left scene image has the same y-coordinate component on the right scene image. If they are not aligned, compensation or adjustment can be made.

The left image plane 610 and the right image plane 620 are shown as two lines when viewed from top down. They are located at a distance of f, the focal length, from the focal point $O_L$ and $O_R$. The object P has a left object image Q on the left image plane 610 and a right object image R on the right image plane 620. Q and R have x-components of xL and xR, respectively. The depth position or the z-coordinate component of P is the unknown. As will be shown, the stereo imaging provides calculation of this unknown depth position.

The projections of P, Q, and R on the x-axis are L, H, and K, respectively. Let b be the distance between the two focal points or the distance between the two image sensors. The length of $O_L L$ is x and the length of $O_R L$ is b−x. The expressions for the triangles $O_L QH$ and $O_L PL$ provide the following expressions:

$$f/z = x_L/x \qquad (1)$$

$$f/z = x_R/(b-x) \qquad (2)$$

Equation (1) provides:

$$x = zx_L/f \qquad (3)$$

Equation (2) provides:

$$z = (b-x)f/x_R \qquad (4)$$

Substituting (3) into (4) to obtain:

$$z = (bf - zx_L)/x_R \qquad (5)$$

which gives:

$$z = bf/(x_L + x_R) \tag{6}$$

Since b, f, $x_L$ and $x_R$ are known quantities, the depth position z can be determined from equation (6).

The above expressions can be developed in a similar manner for the y-coordinate components if necessary. Therefore, the complete (x, y, z) coordinates or the position of the object P can be determined. As long as Q and R are matched to correspond to the same object P, their horizontal and/or vertical positions can be used together with the sensor distance and the focal length to provide the depth position.

After the three-dimensional (3-D) positions of two objects P (x, y, z) and P'(x', y', z') in the scene are determined, their relative position or distance vector $R_{PQ}$ can be computed by computing the difference for each component:

$$R_{PQ} = (x'-x, y'-y, z'-z) \tag{7}$$

Figure 7:
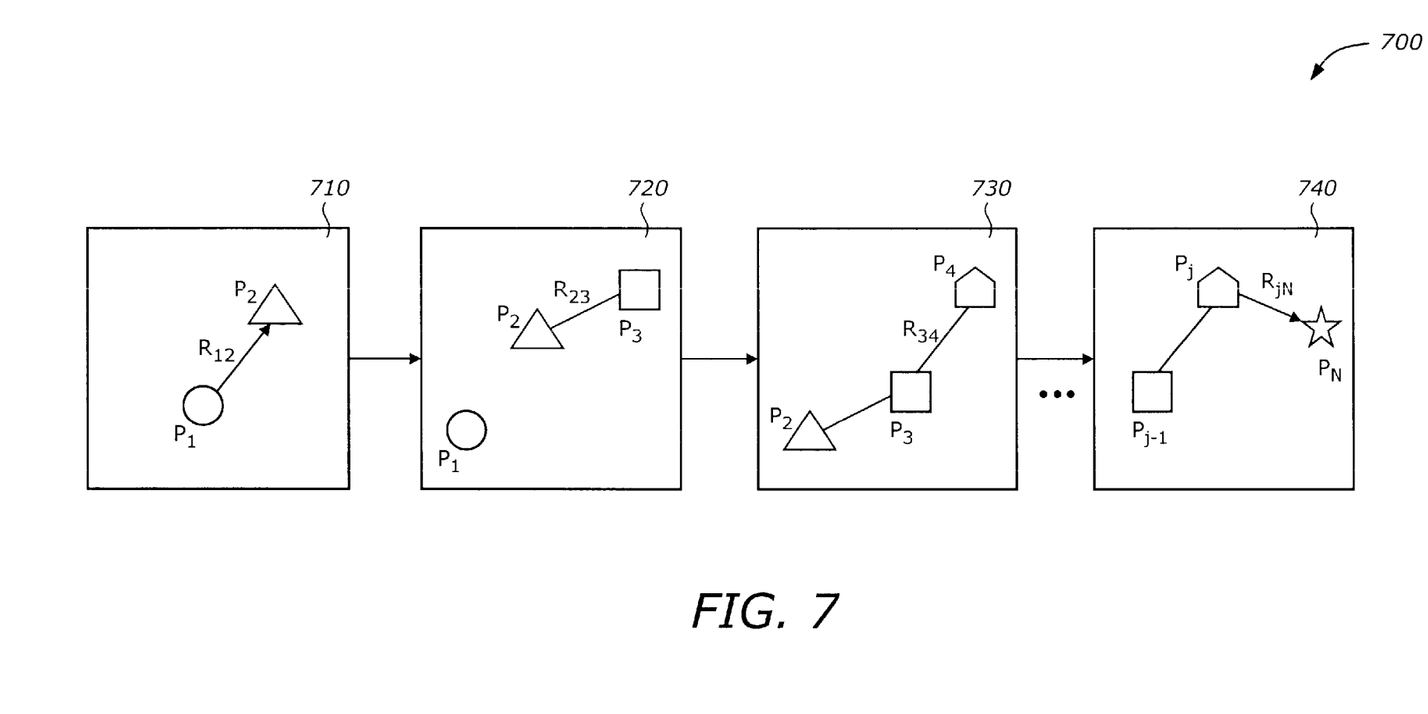
FIG. 7 is a diagram illustrating a sequence of images for object position location according to one embodiment of the invention.

FIG. 7 is a diagram illustrating a sequence 700 of images for object position location according to one embodiment of the invention. For illustrative purposes, the diagram shows the objects in the scene instead of the left and right scene images.

The sequence 700 includes scenes or frames 710, 720, 730, and 740. These scenes represent the views as captured by the vision assembly 110 as it moves away from the original object. Scene 710 has two objects P1 and P2. P1 is the original object and is used as the reference position from which the final destination position is computed. Scene 720 has three objects P1, P2, and P3. Scene 730 has three objects P2, P3, and P4. Scene 740 is the final scene which has three objects $P_{j-1}$, $P_j$, and $P_N$.

In scene 710, a relative position between P1 and P2 is computed as the vector R12. This relative position is computed using the stereo imaging process as illustrated above. In scene 720, a relative position between P2 and P3 is computed as vector R23. Since P2 in scene 720 is moved from P2 in scene 710, its 3-D position with respect to the coordinate system at scene 720 is adjusted accordingly. The relative position between P3 and the original position P1 is then computed as $$R_{13} = R_{12} + R_{23}. \tag{8}$$

The process can then be repeated until the destination is reached. At that time, the relative position between PN (the final object) and the original object is computed as:

$$R_{1N} = R_{12} + R_{23} + \ldots + R_{j-1,j} + R_{jN} \tag{9}$$

Or:

$$R_{1N} = R_{1j} + R_{jN} \tag{10}$$

Since the relative positions between the original object and the current object in the scene are updated every scene or frame, the last computation takes the same amount of calculations as any other previous scenes. The computations of the relative positions may be smoothed by imposing rigidity constraints or motion constraints such as smooth trajectory. For example, if there is too much disturbance, such as occlusions caused by obstacles, the computation may be temporary suspended. To provide reliability in calculations, multiple object points or clusters of object points for each scene may be obtained. Note that only two object points for the same object need to be obtained for two successive scenes. Any new object point can be acquired in the scene as the next landmark position. When multiple object points are used, the clusters of points or the object points that have the shorter depth positions are usually kept so that the backtracking can find locations of objects that are close to the user/carrier 120. This vision assembly can calculate the difference between the original locations and a reference location so that additional information can be computed. For example, based on the height of a floor and the vertical position difference, the vision assembly 110 can determine what floor the car is parked.

The successive relative positions $R_{12}$, $R_{23}$, $R_{34}$, ..., $R_{i,N-1}$, $R_{N-1, N}$ are saved in memory so that they can be retrieved to allow backtracking to return to the original location. The backtracking can start at the location N. The relative position vectors are then reversed to provide the next location in the sequence. For example, from the location N and the relative position $R_{N-1,N}$, the reverse relative position is $R_{N, N-1} = -R_{N-1, N}$. From this reverse relative position, the next location N-1 can be determined. The process is then repeated to determine the next location i, i−1, ..., 4, 3, 2, and then the original location 1. The vision assembly 110 provides backtrack information to guide the user/carrier to return to the original location. This may be performed by displaying directional arrows (East, West, North, South, North-West, North-East, South-West, South-East), displaying text (e.g., "the next location is two feet on the right"), generating voice, flashing arrows, etc. The user can interact with the vision assembly to inquire the next position by pressing a button, or activate other command.

Figure 8:
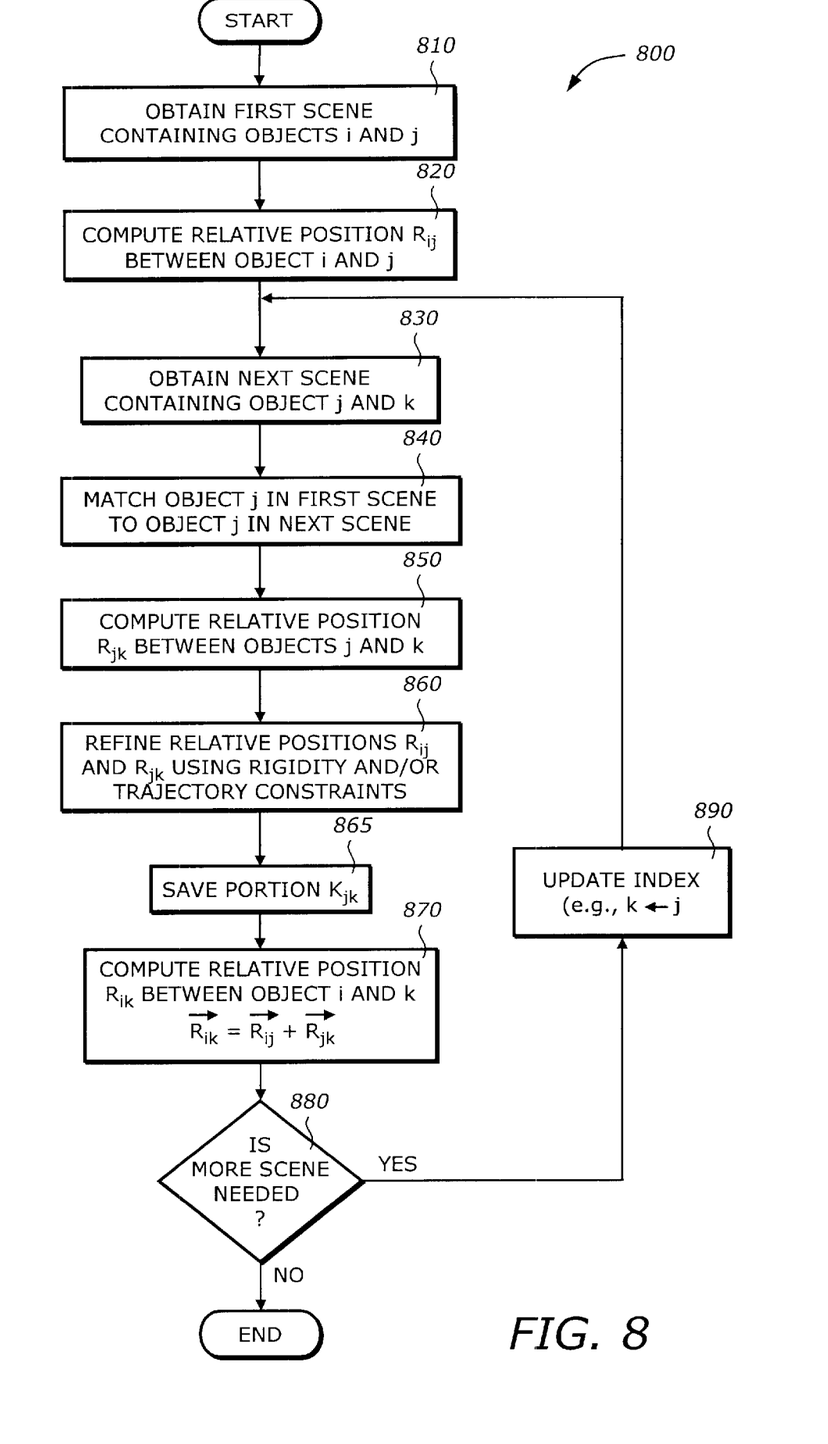
FIG. 8 is a flowchart illustrating a process to locate object position according to one embodiment of the invention.

FIG. 8 is a flowchart illustrating a process 800 to locate object position according to one embodiment of the invention.

Upon START, the process 800 obtains the first scene containing objects i and j (Block 810). Object i is the original position. Then, the process 800 computes the relative position $R_{ij}$ between objects i and j (Block 820). The details of Block 820 are described in FIG. 9. Next, the process 800 saves the relative position Rij in memory (Block 825).

Then, the process 800 obtains the next scene containing objects j and k (Block 830). Next, the process 800 matches object j in the first scene to object j in the next scene (Block 840). The next scene is the scene captured by the image sensors at the next time instant. Then, the process 800 computes the relative position $R_{jk}$ between the objects j and k (Block 850). The details of Block 850 are described in FIG. 9.

Next, the process 800 refines the relative positions $R_{jk}$ using a rigidity constraint and/or a motion constraint (Block 860). For example, positions in successive scenes fo the same objects should be on a smoothed trajectory. Then, the process 800 saves the relative position $R_{jk}$ (Block 865) in memory. Next, the process 800 computes the relative position $R_{ik}$ between the objects i and k (Block 870). This can be performed by computing the sum of the two vectors $R_{ij}$ and $R_{jk}$.

Then, the process 800 determines if another scene is needed (Block 880) or if the destination has been reached. If so, the process 800 updates the index of the objects and the scene (Block 890) such as k←j and (first scene)←(next scene) and returns to Block 830 to continue the process. Otherwise, if no more scene is needed or if the destination has been reached, the process 800 is terminated.

Figure 9:
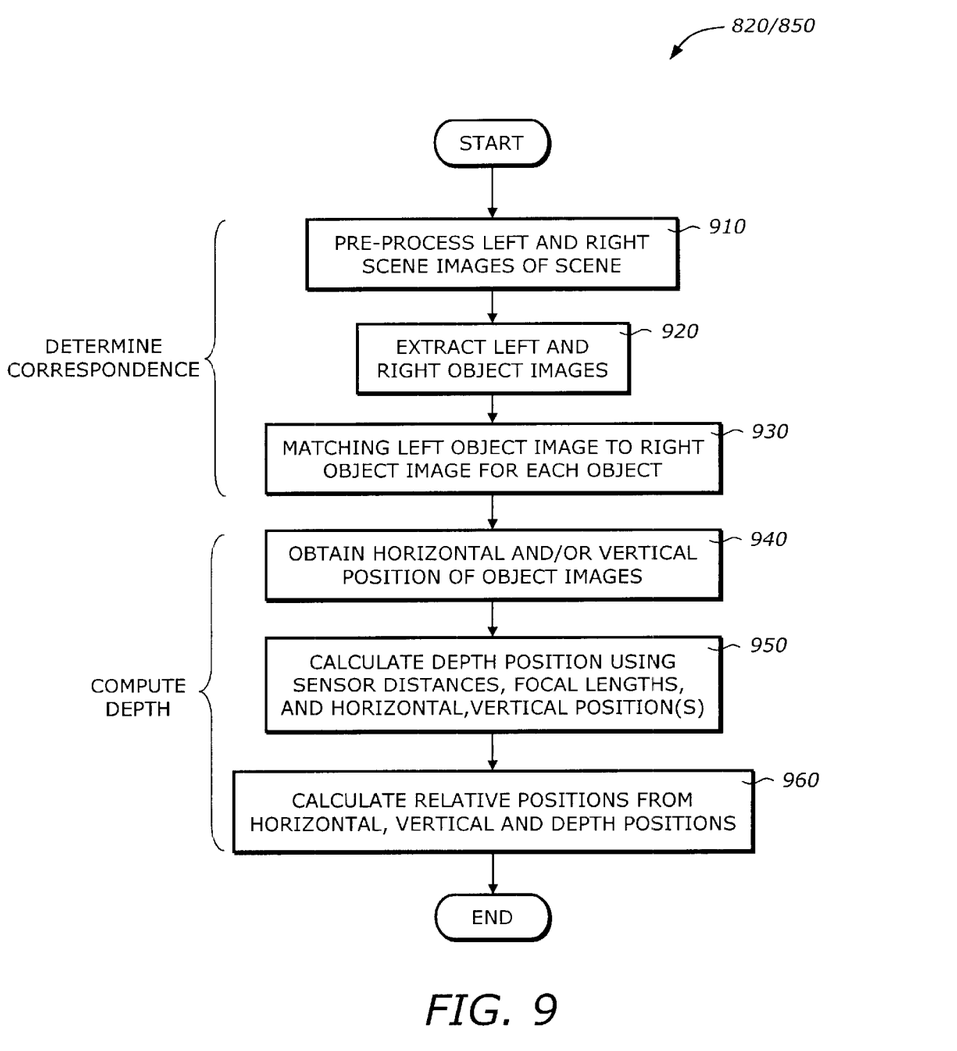
FIG. 9 is a flowchart illustrating a process to calculate relative position according to one embodiment of the invention.

FIG. 9 is a flowchart illustrating the process to calculate relative position 820/850 according to one embodiment of the invention.

Upon START, the process 820/850 pre-processes the left and right scene images of the scene (Block 910). This may include operations (e.g., filtering, edge detection, corner detection, blob detection) to facilitate or enhance the feature extraction operation Then, the process 820/850 extracts the left and right object images of the object in the scene (Block 920). The number of object images or object points to be extracted depends on the desired robustness, accuracy, or computational requirements. Next, the process 820/850 matches the left object image to the right object image for each object (Block 930). The details of Block 930 are described in FIG. 10. The Blocks 910, 920 and 930 form the correspondence process.

Then, the process 820/850 obtains the horizontal and/or vertical position of the object images from the scene images (Block 940). Next, the process 820/850 calculates the depth positions using the sensor distance, focal lengths, and horizontal and/or vertical positions (Block 950). The Blocks 940 and 950 form the depth computation process.

Next, the process 820/850 calculates the relative positions from the horizontal, vertical, and depth positions (Block 960), and is then terminated.

Figure 10:
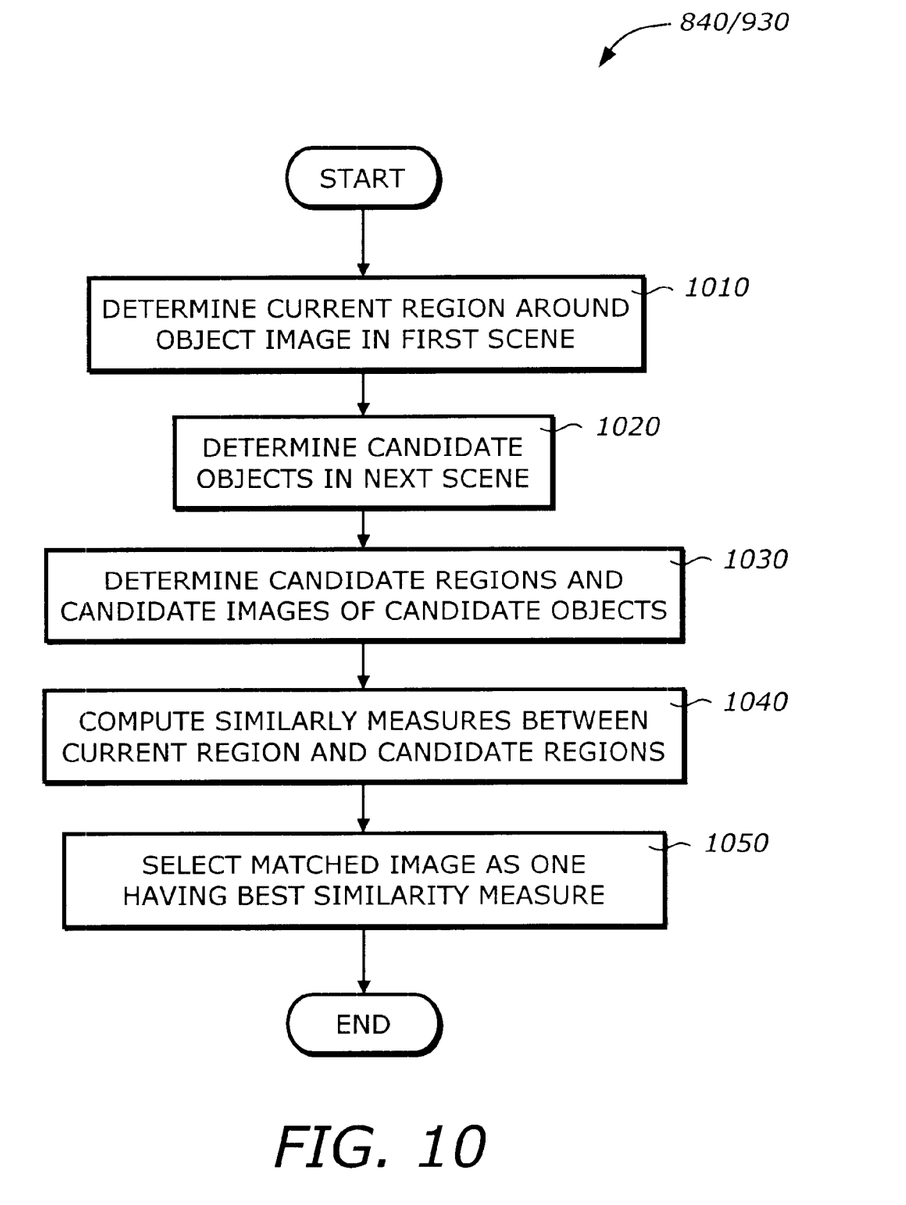
FIG. 10 is a flowchart illustrating a process to match objects according to one embodiment of the invention.

FIG. 10 is a flowchart illustrating the process 840/930 to match objects according to one embodiment of the invention.

Upon START, the process 840/930 determines the current region around the object image in the first scene (Block 1010). The first scene may be the right (or left) scene image or the scene at time instant t1. Next, the process 840/930 determines the candidate objects in the next scene (Block 1020). The next scene may be the left (or right) scene image or the scene at the next time instant t2.

Then, the process 840/930 determines the candidate regions around the candidate images of the candidate objects (Block 1030). Next, the process 840/930 computes the similarity measures between the current region and the candidate regions (Block 1040). Then, the process 840/930 selects the matched image as the one having the best or highest similarity measure (Block 1050) and is next terminated.

Figure 11:
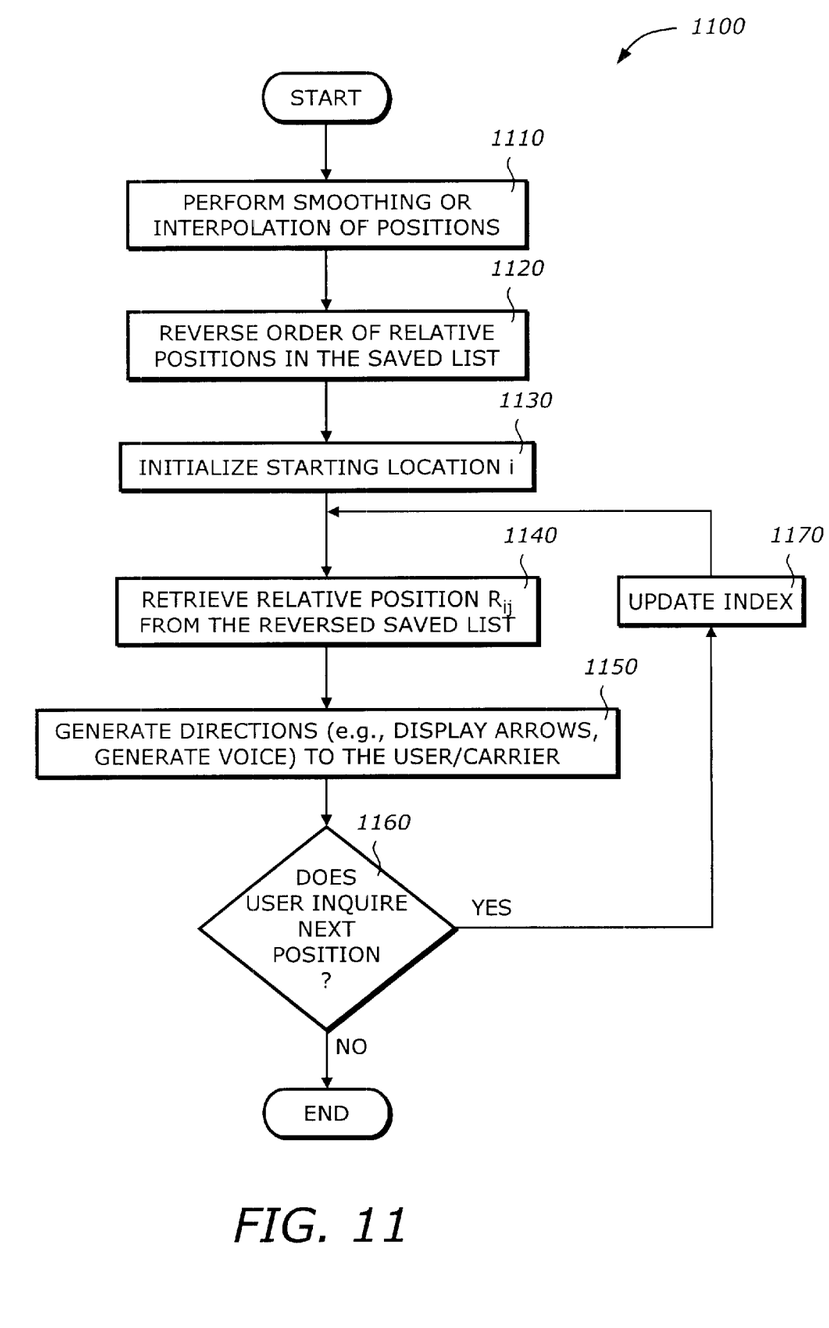
FIG. 11 is a flowchart illustrating a process 1100 to return to the original position according to one embodiment of the invention.

Upon START, the process 1100 performs smoothing or interpolations of the positions (Block 1110) of the relative positions obtained in the process 800 shown in FIG. 8. This may include recomputing the absolute coordinates (x, y, z) in accordance to a trajectory constraint, such as smoothing constraint. Then, the process 1100 reverses the order of the saved list of the relative positions (Block 1120). This reversed order allows the user to backtrack the trajectory and return to the original position. Next, the process 1100 initializes the starting position (Block 1130). The process 1100 may also calculates the original position and report its relative position with respect to the current starting position. The user can estimate how far the original position is. For example, the process 1100 may calculate what floor the parked car is if the floor height information is entered.

Then, the process 1100 retrieves the relative position $R_{ij}$ from the reversed saved list (Block 1140). Next, the process 1100 generates directions (e.g., display arrows on the display, generates voice, display flashing lights) to the user (Block 1150). Then, the process 1100 determines if the user inquire the next position (Block 1160). If so, the process 1100 updates the index that points to the reversed saved list (Block 1170) and then goes back to Block 1140 to continue the backtracking. Otherwise, the process 1100 is terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:

computing a first relative position of the first object with respect to a second object in a first scene using a current first image of the first object and a second image of the second object provided by at least first and second image sensors;

matching the current first image in the first scene with a next first image of the first object in a second scene, the second scene containing a third object having a third image; and computing a second relative position of the third object with respect to the second object in the second scene using the third image and the next first image.

2. The method of claim 1 further comprising:

computing a third relative position of the third object with respect to the first object using the first and second relative positions.

3. The method of claim 1 wherein computing the first relative position comprises:

determining a first correspondence between the current first image and the second image; and computing a current first depth and a second depth of the first and second objects, respectively, using the first correspondence.

4. The method of claim 1 wherein matching comprises:

determining a current region around the current first image in the first scene;

determining a plurality of candidate objects in the second scene;

determining a plurality of candidate regions around the candidate images of candidate objects;

computing similarity measures between the current region and the candidate regions; and selecting the next first image to have highest similarity measure.

5. The method of claim 1 wherein computing the second relative position comprises:

determining a second correspondence between the third image and the next first image; and computing a next first depth and a third depth of the second and third objects, respectively, using the second correspondence.

6. The method of claim 1 further comprises:

refining the first and second relative positions using at least one of a rigidity constraint and a trajectory constraint imposed on the first, second, and third objects.

7. The method of claim 3 wherein determining the first correspondence comprises:

pre-processing left and right first scene images of the first scene, the left and right first scene images being provided by first and second image sensors;

extracting a left current first image and a right current first image from the left and right first scene images, the left and right current first images corresponding to the current first image of the current first object;

extracting a left second image and a right second image from the left and right first scene images, the left and right second images corresponding to the second image of the second object; and matching the left current first image and the left second image to the right current first image and the right second image, respectively.

8. The method of claim 5 wherein determining the second correspondence comprises:

pre-processing left and right second scene images of the second scene, the left and right second scene images being provided by first and second image sensors;

extracting a left next first image and a right next first image from the left and right second scene images, the left and right next first images corresponding to the next first image of the next first object;

extracting a left third image and a right third image from the left and right second scene images, the left and right third images corresponding to the third image of the third object; and matching the left next first image and the left third image to the right next first image and the right third image, respectively.

9. The method of claim 7 wherein computing a current first depth and a second depth comprises:

determining at least one of a left first horizontal position, a right first horizontal position, a left first vertical position, and a right first vertical position of the left current first image and a right current first image;

determining at least one of a left second horizontal position, a right second horizontal position, a left second vertical position, and a right second vertical position of the left second image and the right second image;

calculating the current first depth using a sensor distance between the first and second image sensors, focal lengths of the image sensors, and the at least one of the left first horizontal position, the right first horizontal position, the left first vertical position, and the right first vertical position; and calculating the second depth using the sensor distance, the focal lengths of the image sensors, and the at least one of the left second horizontal position, the right second horizontal position, the left second vertical position, and the right second vertical position.

10. The method of claim 8 wherein computing the next first depth and the third depth comprises:

determining at least one of a left first horizontal position, a right first horizontal position, a left first vertical position, and a right first vertical position of the left next first image and a right next first image;

determining at least one of a left third horizontal position, a right third horizontal position, a left third vertical position, and a right third vertical position of the left third image and the right third image;

calculating the next first depth using a sensor distance between the first and second image sensors, focal lengths of the image sensors, and the at least one of the left first horizontal position, the right first horizontal position, the left first vertical position, and the right first vertical position; and calculating the third depth using the sensor distance, the focal lengths of the image sensors, and the at least one of the left third horizontal position, the right third horizontal position, the left third vertical position, and the right third vertical position.

11. An article of manufacture comprising:

a machine-accessible medium including data that, when accessed by a machine, causes the machine to perform operations comprising:

computing a first relative position of the first object with respect to a second object in a first scene using a current first image of the first object and a second image of the second object provided by at least first and second image sensors;

matching the current first image in the first scene with a next first image of the first object in a second scene, the second scene containing a third object having a third image; and computing a second relative position of the third object with respect to the second object in the second scene using the third image and the next first image.

12. The article of manufacture of claim 11 wherein the data further comprises data that causes the machine to perform operations comprising:

computing a third relative position of the third object with respect to the first object using the first and second relative positions.

13. The article of manufacture of claim 11 wherein the data causing the machine to perform computing the first relative position comprises data that, when accessed by the machine, causes the machine to perform operations comprising:

determining a first correspondence between the current first image and the second image; and computing a current first depth and a second depth of the first and second objects, respectively, using the first correspondence.

14. The article of manufacture of claim 11 wherein the data causing the machine to perform matching comprises data that, when accessed by the machine, causes the machine to perform operations comprising:

determining a current region around the current first image in the first scene;

determining a plurality of candidate objects in the second scene;

determining a plurality of candidate regions around the candidate images of candidate objects;

computing similarity measures between the current region and the candidate regions; and selecting the next first image to have highest similarity measure.

15. The article of manufacture of claim 11 wherein the data causing the machine to perform computing the second relative position comprises data that, when accessed by the machine, causes the machine to perform operations comprising:

determining a second correspondence between the third image and the next first image; and computing a next first depth and a third depth of the second and third objects, respectively, using the second correspondence.

16. The article of manufacture of claim 11 wherein the data further comprises data that causes the machine to perform operations comprising:

refining the first and second relative positions using at least one of a rigidity constraint and a trajectory constraint imposed on the first, second, and third objects.

17. The article of manufacture of claim 13 wherein the data causing the machine to perform determining the first correspondence comprises data that, when accessed by the machine, causes the machine to perform operations comprising:

pre-processing left and right first scene images of the first scene, the left and right first scene images being provided by first and second image sensors;

extracting a left current first image and a right current first image from the left and right first scene images, the left and right current first images corresponding to the current first image of the current first object;

extracting a left second image and a right second image from the left and right first scene images, the left and right second images corresponding to the second image of the second object; and matching the left current first image and the left second image to the right current first image and the right second image, respectively.

18. The article of manufacture of claim 15 wherein the data causing the machine to perform determining the second correspondence comprises data that, when accessed by the machine, causes the machine to perform operations comprising:

pre-processing left and right second scene images of the second scene, the left and right second scene images being provided by first and second image sensors;

extracting a left next first image and a right next first image from the left and right second scene images, the left and right next first images corresponding to the next first image of the next first object;

extracting a left third image and a right third image from the left and right second scene images, the left and right third images corresponding to the third image of the third object; and matching the left next first image and the left third image to the right next first image and the right third image, respectively.

19. The article of manufacture of claim 17 wherein the data causing the machine to perform computing a current first depth and a second depth comprises data that, when accessed by the machine, causes the machine to perform operations comprising:

determining at least one of a left first horizontal position, a right first horizontal position, a left first vertical position, and a right first vertical position of the left current first image and a right current first image;

determining at least one of a left second horizontal position, a right second horizontal position, a left second vertical position, and a right second vertical position of the left second image and the right second image;

calculating the current first depth using a sensor distance between the first and second image sensors, focal lengths of the image sensors, and the at least one of the left first horizontal position, the right first horizontal position, the left first vertical position, and the right first vertical position; and calculating the second depth using the sensor distance, the focal lengths of the image sensors, and the at least one of the left second horizontal position, the right second horizontal position, the left second vertical position, and the right second vertical position.

20. The article of manufacture of claim 8 wherein the data causing the machine to perform computing the next first depth and the third depth comprises data that, when accessed by the machine, causes the machine to perform operations comprising:

determining at least one of a left first horizontal position, a right first horizontal position, a left first vertical position, and a right first vertical position of the left next first image and a right next first image;

determining at least one of a left third horizontal position, a right third horizontal position, a left third vertical position, and a right third vertical position of the left third image and the right third image;

calculating the next first depth using a sensor distance between the first and second image sensors, focal lengths of the image sensors, and the at least one of the left first horizontal position, the right first horizontal position, the left first vertical position, and the right first vertical position; and calculating the third depth using the sensor distance, the focal lengths of the image sensors, and the at least one of the left third horizontal position, the right third horizontal position, the left third vertical position, and the right third vertical position.

* * * * *